United States Patent Office 3,175,472
Patented Mar. 30, 1965

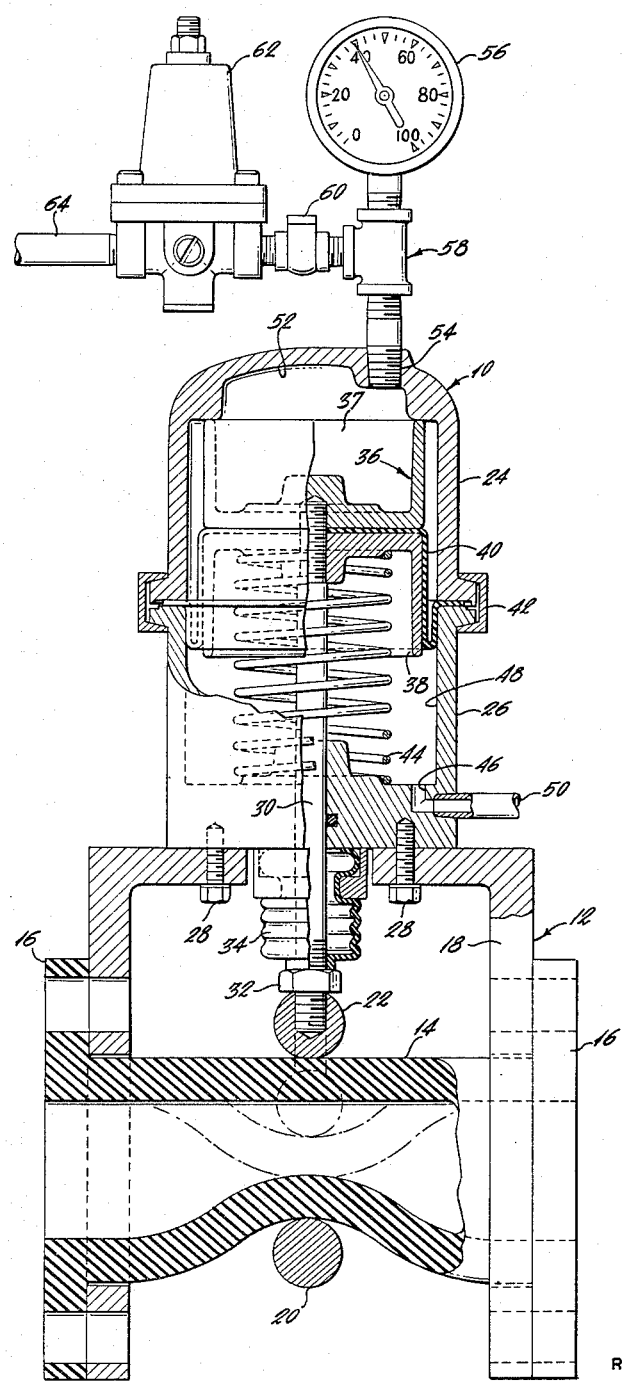

3,175,472
FLUID MOTOR
Robert K. Little, Mount Holly, N.J., assignor to RKL Controls, Inc., Hainesport, N.J., a corporation of New Jersey
Filed July 13, 1962, Ser. No. 209,521
4 Claims. (Cl. 92—94)

The present invention relates generally to piston type fluid motors having a rolling diaphragm secured between the piston and the cylinder and more specifically to such a motor having fluid pressures acting on both sides of the piston and diaphragm to effect movement thereof.

The use of a diaphragm is far more effective than piston rings in preventing fluid leakage between a piston and the cylinder walls. A thin flexible diaphragm forms an air-tight seal and permits the maintaining of fluid pressures in a cylinder chamber over extended periods of time. A limitation of such an arrangement, however, is the inability of a rolling type diaphragm to sustain dominant pressures from alternate sides of a piston due to its doubled-back or folded disposition. A higher or dominant piston-actuating pressure can only be applied on one face of a piston, otherwise the diaphragm may be inclined to reverse its position, causing a possible binding and tearing of the diaphragm.

Accordingly, it is a primary object of the present invention to provide a rolling diaphragm fluid motor which may be alternately actuated by fluid pressure forces in either direction without affecting the disposition of the diaphragm.

Additional objects and advantages of the invention will be more readily apparent from the following detailed description of an embodiment thereof when taken together with the accompanying drawing which is a sectional elevational view showing an embodiment of the invention operably mounted on a pinch-type valve.

Referring to the drawing, an air motor 10 is mounted as the actuating unit on a pinch-valve assembly 12. The pinch valve consists of a cylindrical resilient body 14 having end flanges 16 drilled to correspond with valve yoke 18. Stationary lower pinch bar 20 deforms the body 14 upwardly to provide a seat upon which the opposing body wall may be contacted in sealing relationship upon depression thereof by the vertically movable upper pinch bar 22 as indicated by the broken lines of the drawing. The air motor 10 is operable to actuate the upper pinch bar and thus control flow through the valve.

The fluid motor includes upper and lower cylinder members 24 and 26, the lower member being secured to the pinch valve yoke 18 by bolts 28. The lower cylinder member is centrally apertured to provide sliding passage of shaft 30, the lower end of which is threaded for engagement with the upper pinch bar 22. Lock nut 32 on the shaft prevents loosening of the shaft in the pinch bar. A suitable packing gland 34 is secured around the shaft 30 below the lower cylinder member 26 to prevent leakage of fluids from the cylinder.

Attached to the upper end of the shaft 30 is piston 36 formed of two similar upper and lower piston elements 37 and 38. Secured between the two piston elements is a thin flexible diaphragm 40 which extends from between the piston elements downwardly along the circumferential face of the lower piston element. The diaphragm is folded back upwardly to the juncture of the upper and lower cylinder members 24 and 26 between which it is secured by clamping means 42. The diameter of the piston elements is such as to provide a suitable clearance between the cylinder walls to permit a rolling action of the diaphragm upon movement of the piston.

A coil spring 44 is disposed about the shaft 30 in compression between the lower cylinder member 26 and the lower piston element 38 to provide a continual upward force against the piston.

Fluid port 46 provides a fluid entrance and exit from the lower chamber 48 formed by the lower cylinder member 26, the piston, and the diaphragm. A suitable conduit 50 may be connected with the port 46 to contain and direct at fluid flow.

To provide fluid access to the upper chamber 52 formed by the upper cylinder member 24 and the piston and diaphragm, an upper fluid port 54 is provided in the upper cylinder member 24. A pressure gauge 56 is connected by means of suitable conduit means 58 to indicate fluid pressures within the upper chamber 52.

A fluid passage leading into conduit 58 includes a check valve 60 of such construction and so disposed as to permit a fluid flow only into the chamber 52. A pressure regulating valve 62 is connected with the check valve 60 and is coupled to a conduit 64 leading to a pressurized fluid supply.

In operation, the pressure regulating valve 62 is adjusted to maintain a predetermined minimum air pressure in the upper chamber 52. The pressure required in the upper chamber will depend in each instance on the downward force required to actuate the shaft 30. In this case, a sufficient pressure must be maintained in the upper chamber 52 so that a sufficient force will be developed to depress the upper pinch bar 22 against the pinch valve body 14 into the fully closed valve position indicated in broken lines in the drawing.

The conduit 50 is attached to a fluid supply means capable of providing variable pressures in the lower chamber 48.

To effect an upward movement of the piston, it would normally be necessary to apply a higher pressure to the chamber 48 than exists in the upper chamber 52. However, a higher pressure in the lower chamber would tend to reverse the disposition of the diaphragm which cannot be permitted due to the likelihood of binding and tearing of the diaphragm between the piston and cylinder walls. Additionally, smooth operation of the motor could not be obtained were the diaphragm to reverse prior to each change in direction of the piston.

To prevent reversal of the diaphragm, the coil spring 44 is disposed in compression between the lower cylinder member and the piston so as to permit an upward movement of the piston with a lower pressure below the piston than above, the coil spring augmenting the upward force of the lower chamber pressure. As shown in the drawing, the spring is under compression in the highest position of the piston. The pressure in the lower chamber need never exceed the pressure in the upper chamber and the downwardly extending disposition of the diaphragm is continually maintained throughout the operation of the motor.

The force of the coil spring should be chosen so as to be sufficient to provide the upward lift required by the mechanism as well as to overcome the frictional and gravitational forces acting on the shaft. The spring must also provide a slight additional upward force to insure upward movement of the piston with a lower chamber pressure beneath the piston. Although theoretically any additional force would suffice, in practice a force of ½ to 10 lbs. is added depending on the size of the motor.

In the drawing, the piston is shown in the extreme raised position. The rolling diaphragm in this position is fully supported radially by the piston walls which extend axially to provide such support. Upon release of the air pressure in the lower chamber 48, the trapped air under pressure in the upper chamber actuates the piston and shaft in a downward direction, depressing the upper pinch bar 22 and closing the pinch valve body 14. To reopen the valve, the air pressure is increased in the lower chamber and provides an upward force, which in conjunction with the spring force raises the piston and opens the valve.

The rolling diaphragm effectively seals the chambers, and air leakage from the motor is negligible, particularly from the upper chamber. Accordingly, it is not necessary that the fixed air supply 64 and the pressure regulator valve 62 be permanently attached to the unit. The upper chamber could be charged periodically from a portable air supply should that be a more convenient arrangement.

Similarly, the pressure gauge is not essential, but provides an indication that the upper chamber pressure is suitable for operation of the motor. Checking of the gauge before and during operation would indicate any occurrence of a low pressure condition which might affect the proper operation of the motor and possibly damage the diaphragm.

Manifestly, changes in details of construction can be effected by those skilled in the art without departing from the spirit and the scope of the invention as defined in and limited solely by the appended claims.

I claim:

1. A fluid motor comprising a cylinder, a piston movably disposed within said cylinder, a diaphragm secured to said piston and to the walls of said cylinder dividing said cylinder into two fluid chambers, said diaphragm being so disposed between said piston and cylinder as to permit axial movement of said piston within said cylinder, means sealing a first of said chambers to entrap a fluid under pressure therein, a spring disposed in said cylinder operably engaging and urging said piston toward said first chamber, a fluid port for introducing a fluid under variable pressure into the second of said chambers, said diaphragm extending in folded disposition between said piston and the cylinder walls, the fold of said diaphragm extending toward said second chamber, said spring exerting such a force on said piston that the fluid pressure required in said second chamber to actuate said piston toward said first chamber is less than the fluid pressure in said first chamber at any position of the piston in the cylinder thereby maintaining the extended folded disposition of said diaphragm in the direction of said second chamber.

2. A fluid motor as claimed in claim 1, said cylinder comprising upper and lower cylinder members in contiguous relationship, and said diaphragm being secured between said upper and lower cylinder members.

3. A fluid motor as claimed in claim 1, said spring being axially disposed in compression in said second chamber.

4. A fluid motor as claimed in claim 3, including a shaft secured to said piston extending through an end of said cylinder for transmitting motion from said piston exteriorly of the cylinder.

References Cited by the Examiner
UNITED STATES PATENTS

| | | | |
|---|---|---|---|
| 772,842 | 10/04 | Spencer | 121—38.23 |
| 1,855,696 | 4/32 | Stover | 92—101 |
| 2,079,858 | 5/37 | Horton | 103—152 |
| 2,479,454 | 8/49 | Annin | 251—61 |
| 2,574,700 | 11/51 | Knauss | 137—795 |
| 2,638,931 | 5/53 | Barr | 92—94 X |
| 2,824,186 | 2/58 | Binford | 92—95 X |
| 2,846,983 | 8/58 | Otto | 137—788 |

FRED E. ENGELTHALER, *Primary Examiner.*

EMILE PAUL, *Examiner.*